(12) United States Patent
Drach et al.

(10) Patent No.: US 12,474,322 B2
(45) Date of Patent: Nov. 18, 2025

(54) METHODS AND COMPOSITIONS FOR REDUCING ANTIBIOTIC ADMINISTRATION TO FARM ANIMALS

(71) Applicant: Advanced Animal Diagnostics, Inc., Morrisville, NC (US)

(72) Inventors: Joy Parr Drach, Pontiac, IL (US); Mitchell Hockett, Raleigh, NC (US); Stefano Bresolin, Garner, NC (US); Erik J Jensen, Hillsborough, NC (US); Tobias M. Heineck, Durham, NC (US); Jasper N. Pollard, Durham, NC (US); Deborah Asion, Durham, NC (US); Rodolfo R. Rodriguez, Cary, NC (US); David A. Calderwood, Chapel Hill, NC (US); Norah Gerow Bate, Raleigh, NC (US); John Richard Sink, Raleigh, NC (US); Jorge Carlos Correa, Raleigh, NC (US)

(73) Assignee: Advanced Animal Diagnostics, Inc., Morrisville, NC (US)

(*) Notice: Subject to any disclaimer, the term of this patent is extended or adjusted under 35 U.S.C. 154(b) by 657 days.

(21) Appl. No.: 17/175,114

(22) Filed: Feb. 12, 2021

(65) Prior Publication Data

US 2021/0270803 A1  Sep. 2, 2021

Related U.S. Application Data

(63) Continuation of application No. 15/466,814, filed on Mar. 22, 2017, now abandoned.

(60) Provisional application No. 62/311,706, filed on Mar. 22, 2016.

(51) Int. Cl.
G01N 33/49 (2006.01)

(52) U.S. Cl.
CPC .................................. G01N 33/492 (2013.01)

(58) Field of Classification Search
None
See application file for complete search history.

(56) References Cited

U.S. PATENT DOCUMENTS

| | | | |
|---|---|---|---|
| 4,998,284 A | 3/1991 | Bacus et al. | |
| 5,571,667 A | 11/1996 | Chu et al. | |
| 5,673,647 A | 10/1997 | Pratt | |
| 5,790,710 A | 8/1998 | Price et al. | |
| 5,798,273 A | 8/1998 | Shuler et al. | |
| 5,939,326 A | 8/1999 | Chupp et al. | |
| 6,004,512 A | 12/1999 | Titcomb et al. | |
| 6,350,613 B1 | 2/2002 | Wardlaw et al. | |
| 6,381,058 B2 | 4/2002 | Ramm et al. | |
| 6,617,116 B2 | 9/2003 | Guan et al. | |
| 6,720,160 B2 | 4/2004 | Wolde-Mariam | |
| 6,927,903 B2 | 8/2005 | Stuckey | |
| 6,929,953 B1 | 8/2005 | Wardlaw | |
| 6,979,550 B1 | 12/2005 | Rivas et al. | |
| 7,270,995 B2 | 9/2007 | Matsushita et al. | |
| 7,879,597 B2 | 2/2011 | Esfandiari | |
| 8,000,511 B2 | 8/2011 | Perz | |
| 8,045,165 B2 | 10/2011 | Wardlaw et al. | |
| 8,081,303 B2 | 12/2011 | Levine et al. | |
| 8,418,660 B2 | 4/2013 | Huls | |
| 8,877,450 B2 | 11/2014 | Esfandiari | |
| 2001/0041347 A1 | 11/2001 | Sammak et al. | |
| 2002/0031528 A1 | 3/2002 | Fattom | |
| 2003/0099929 A1 | 5/2003 | Vojdani | |
| 2004/0023404 A1 | 2/2004 | Shibata | |
| 2004/0170601 A1 | 9/2004 | Strom et al. | |
| 2006/0166366 A1 | 7/2006 | Matsumoto et al. | |
| 2009/0233329 A1 | 9/2009 | Rodriguez et al. | |
| 2010/0035812 A1* | 2/2010 | Hays Putnam | C07K 14/535 435/325 |
| 2011/0306511 A1 | 12/2011 | Lea | |
| 2013/0222895 A1 | 8/2013 | Gelbart | |
| 2014/0009596 A1 | 1/2014 | Bresolin et al. | |
| 2014/0186394 A1 | 7/2014 | Jordan et al. | |
| 2014/0233098 A1 | 8/2014 | Bresolin et al. | |
| 2017/0276663 A1 | 9/2017 | Drach et al. | |

FOREIGN PATENT DOCUMENTS

| | | |
|---|---|---|
| DE | 19833636 | 5/2000 |
| WO | 2002056017 | 7/2002 |
| WO | 2007027231 A1 | 3/2007 |
| WO | 2008021862 A2 | 2/2008 |
| WO | 2008039171 A2 | 4/2008 |
| WO | 2015042571 A1 | 3/2015 |
| WO | 2017019743 A1 | 2/2017 |

OTHER PUBLICATIONS

Advanced Animal Diagnostics, Milk Leukocyte Differential (MLD) Allows New Test to "See" Subclinical Mastitis, Early and Accurately, 2014 Mastitis Council, Fort Worth, Texas, Jan. 29, 2014, retrieved from the internet: https://www.qscoutlab.com/mld-sees (Year: 2014).*

(Continued)

*Primary Examiner* — Evelyn Y Pyla
(74) *Attorney, Agent, or Firm* — Myers Bigel, P.A.

(57) ABSTRACT

The present invention provides a method of identifying an animal for which antibiotic treatment, anti-infective treatment, probiotic treatment, immunostimulant treatment, additional monitoring and/or a separate or alternative management strategy is appropriate, comprising: a) collecting a sample from said animal; b) performing a leukocyte differential cell count on said sample; c) comparing said leukocyte differential cell count of (b) with an index of infection; and d) initiating antibiotic treatment, anti-infective treatment, probiotic treatment, immunostimulant treatment, additional monitoring and/or a separate or alternative management strategy of said animal on the basis of said comparing step.

23 Claims, 6 Drawing Sheets

(56) References Cited

OTHER PUBLICATIONS

Atroshi et al., Vet Res (1996) 27, 125-132 (Year: 1996).*
Godden et al., J. Dairy Sci. Vol. 100, No. 8, (2017), pp. 6527-6544 (Year: 2017).*
Roland et al., Journal of Veterinary Diagnostic Investigation, 2014, vol. 26(5) 592-598 (Year: 2014).*
"Office Action corresponding to Australian Application No. 2021250867 issued Nov. 29, 2022".
"Office Action corresponding to Chinese Application No. 201780031352.5 issued Dec. 5, 2022".
"Anonymous: "New Diagnostic Test Can Dramatically Reduce Antibiotic Use, Differentiate Branded Beef Products", Feb. 12, 2016 (Feb. 12, 2016), XP055635433, Retrieved from the Internet: URL:https://www.qscoutlab.comj/new-beef-diagnostic [retrieved on 2019-".
"Extended European Search Report corresponding to European Application No. 17771100.9 dated Nov. 4, 2019".
"International Preliminary Report on Patentability corresponding to International Patent Application No. PCT/US2017/023675 (15 pages) (mailed Oct. 4, 2018)".
"International Search Report and the Written Opinion of the International Searching Authority corresponding to International Patent Application No. PCT/US2017/015453 (16 pages) (mailed May 31, 2017)".
"International Search Report and the Written Opinion of the International Searching Authority corresponding to International Patent Application No. PCT/US2017/023675 (17 pages) (mailed Jun. 16, 2017)".
"Mayo Clinic "Mycoplasma pneumoniae Antibodies, IgG and igM, Serum" Test ID: MYCPN (3 pages) (Jun. 10, 2013)".
"Meridian Healthcare "Immunoflow" Mycoplasma pneumoniae IgM Test (4 pages) (Jun. 1, 2014)".
"Office Action corresponding to Australian Application No. 2017238217 issued Oct. 12, 2020".
"Qscout Farm Lab Product Brochure www.qscoutlab.com (2 pages) (Dec. 24, 2014)".
"QScout MLD, Diagnosing subclinical mastitis with QScout MLD fosters more efficient use of antibiotics in selectively treating infection by quarter at dryoff, Advanced Animal Diagnostics, 2014; retrieved from the internet: http://www.qscoutlab.com/wp-conte".
"QScout MLD, QScout MLD Outperforms CMT, Detect mastitis objectively and accurately, Advanced Animal Diagnostics, 2015; retrieved from the internet: http://www.qscoutlab.com/wp-content/uploads/2015/10/QScoutMLD_VS_CMT_White_Paper.pdf".
"Venipuncture, For use with vacutainer tubes", WHO, CDC, retrieved from the internet May 8, 2019: https://www.who.int/diagnostics_laboratory/documents/guidance/venipuncture.pdf?ua=1.
Alhussien, Mohanned, et al., "A comparative study on the blood and milk cell counts of healthy, subclinical, and clinical mastitis Karan Fries cows", Veterinary World, EISSN: 2231-0916, available at www.veterinaryworld.org/Vol.8/May-2015/22.pdf, pp. 685-689.
Anderson, K.L., et al., "Fresh cow mastitis monitoring on day 3 postpartum and its relationship to subsequent milk production", J. Dairy Sci., 2010, vol. 93, pp. 5673-5683.
Eterpi, et al., ""Decontamination efficacy against Mycoplasma" Letters in Applied Microbiology 52:150-155 (2010)".
Pezeshki, et al., Veterinary Research, 2011,42:15, pp. 1-10 (Year: 2011).
Rollins, et al., "The Bovine Practitioner, vol. 43, No. 2, Summer 2009, pp. 84-87 (Year: 2009)".
Ruegg, et al., ""Milk Quality and Mastitis Tests" University of Wisconsin (34 pages) (2002)".
Ruegg, et al., "Extension: Responsible Use of Antibiotics for Treatment of Clinical Mastitis", Oct. 26, 2015,pp. 1-5; retrieved from the internet: https:1/articles.extension.org/pages/72958/responsible-use-of-antibiotics-for-treatment-of-clinical-mastitis.
Stilwell, et al., ""The Effect of Duration of Manual Restraint During Blood Sampling on Plasma Cortisol Levels in Calves" Animal Welfare 17:383-385 (2008)".
Swiderek, et al., "Ann. Anim. Scl., vol. 16, No. 1 (Jan. 2016), pp. 155-170 (Year: 2016)".
Thomas, et al., "Beef Cattle Get Mastitis Too", Apr. 20, 2009, retrieved from the internet: https://www.grainews.ca/news/beef-cattle-get-mastitis-too/ (Year: 2009).
"Office Action corresponding to Australian Application No. 2017238217 issued Oct. 5, 2021".
"Office Action corresponding to Chinese Application No. 201780031352.5 issued Sep. 3, 2021".
"Office Action corresponding to Chinese Application No. 201780031352.5 issued Apr. 27, 2022".
"Office Action corresponding to Australian Application No. 2021250867 issued Nov. 16, 2023".
United Nations General Assembly declaration on antimicrobial resistance (Oct. 5, 2016).
"Office Action corresponding to Canadian Application No. 3,018,204 issued Sep. 1, 2023".
"PRNewswire Food Industry Microlist", (May 12, 2017).
"Examination Report corresponding to European Application No. 17771100.9 dated Apr. 13, 2023".
"Feedlot", Wikipedia The Free Dictionary https://en.wikipedia.org/wiki/Feedlot (Feb. 10, 2025) 7 pages.
"Office Action corresponding to Australian Application No. 2023270236 dated Jul. 23, 2025".

* cited by examiner

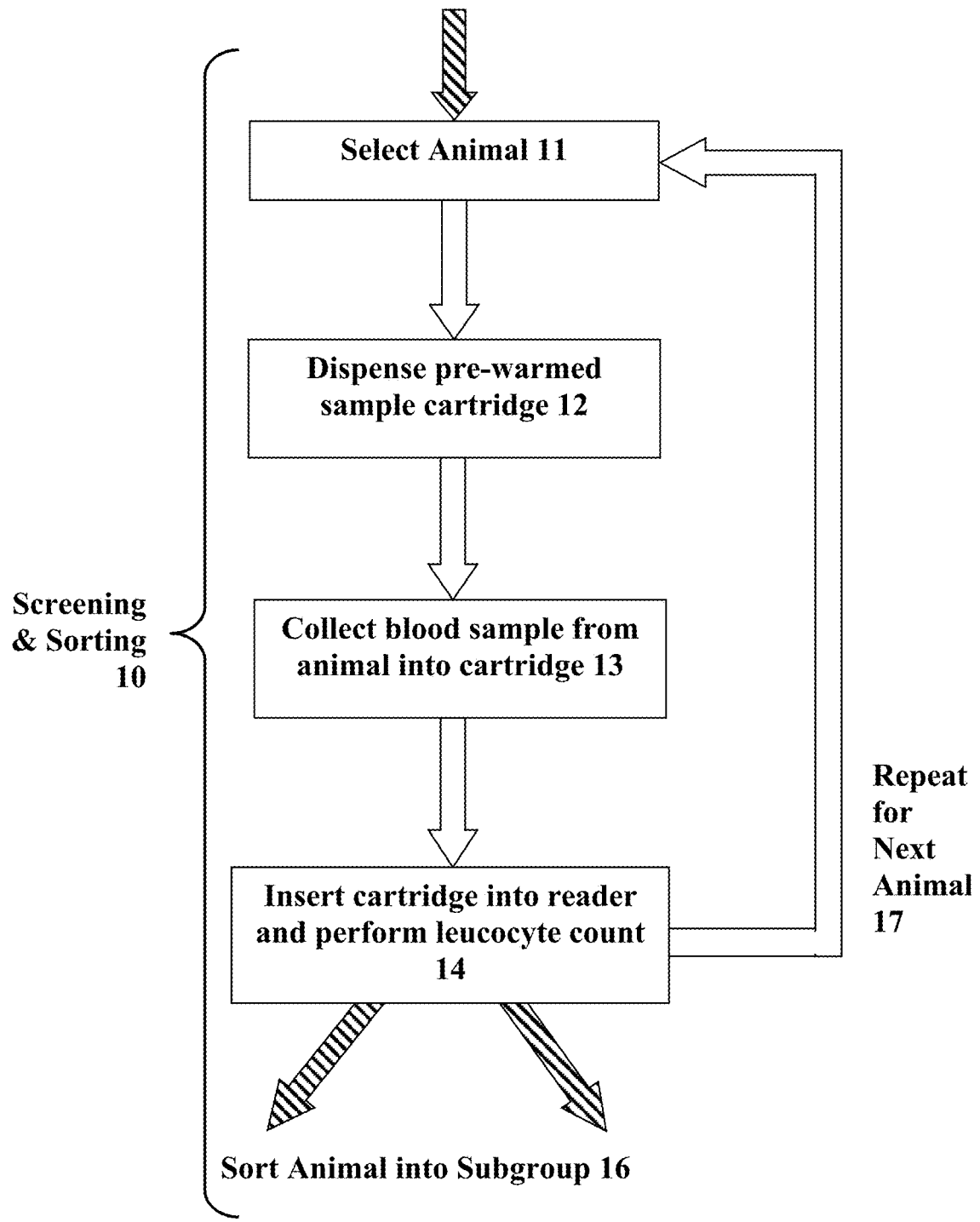
FIG. 2: Screening and Sorting

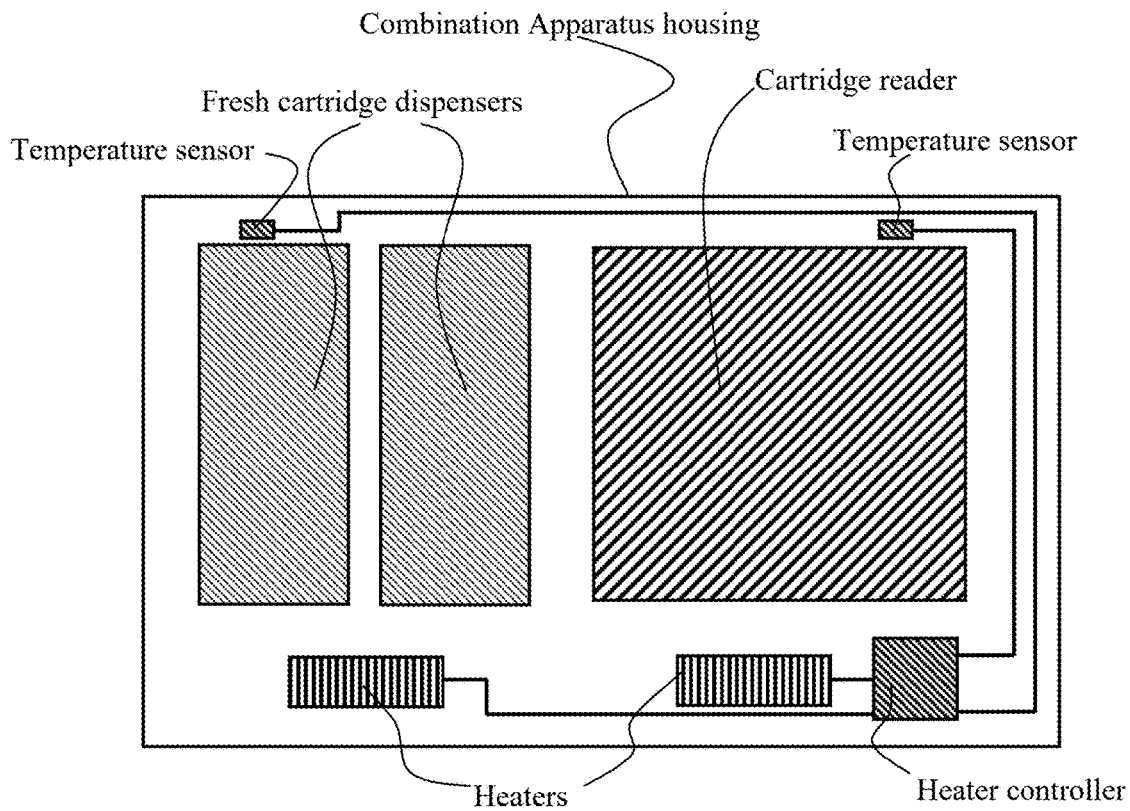
FIG. 3A: Heated Cartridge Dispenser and Reader Internal Schematic View.
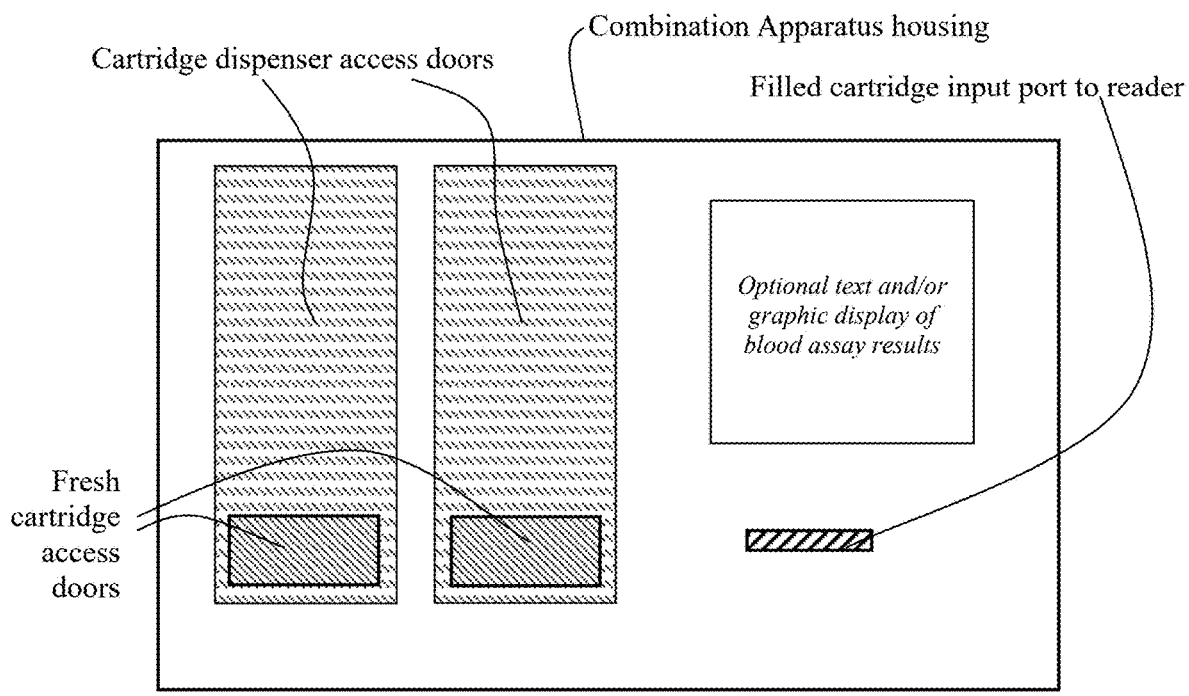
FIG. 3B: Heated Cartridge Dispenser and Reader External View.

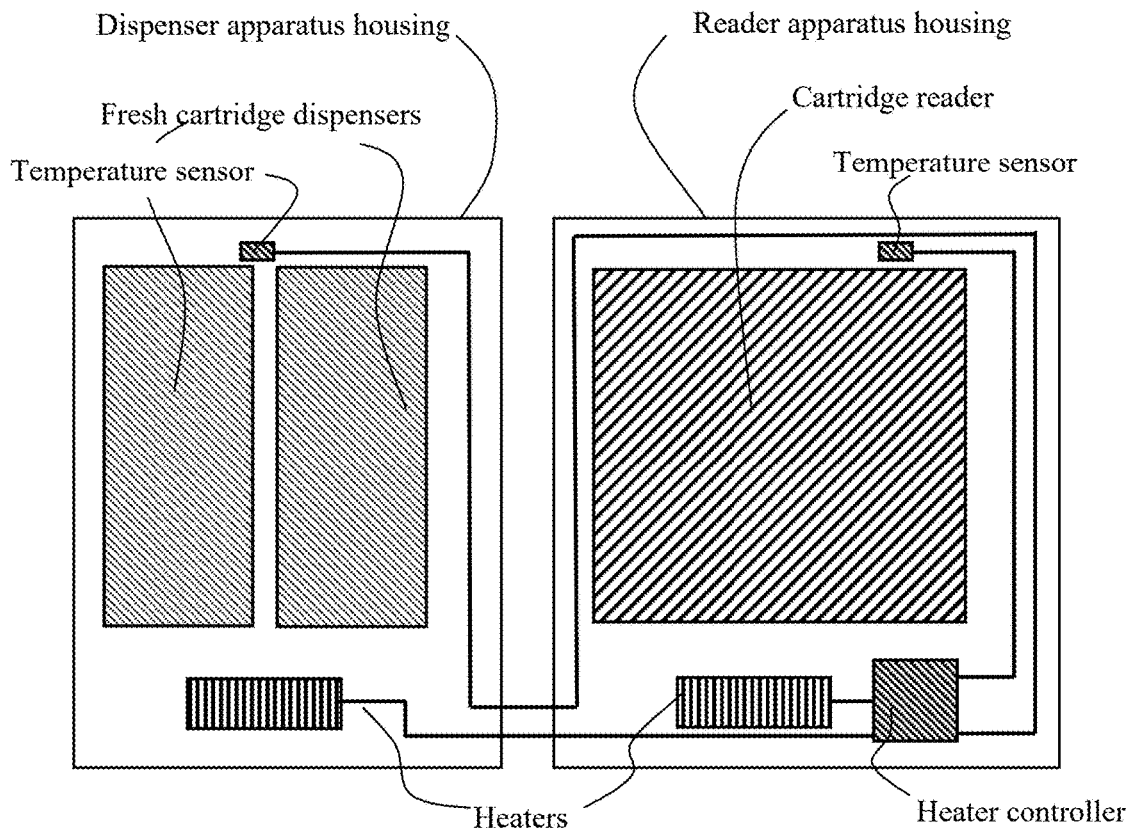
FIG. 4A: Heated Cartridge Dispenser and Reader System
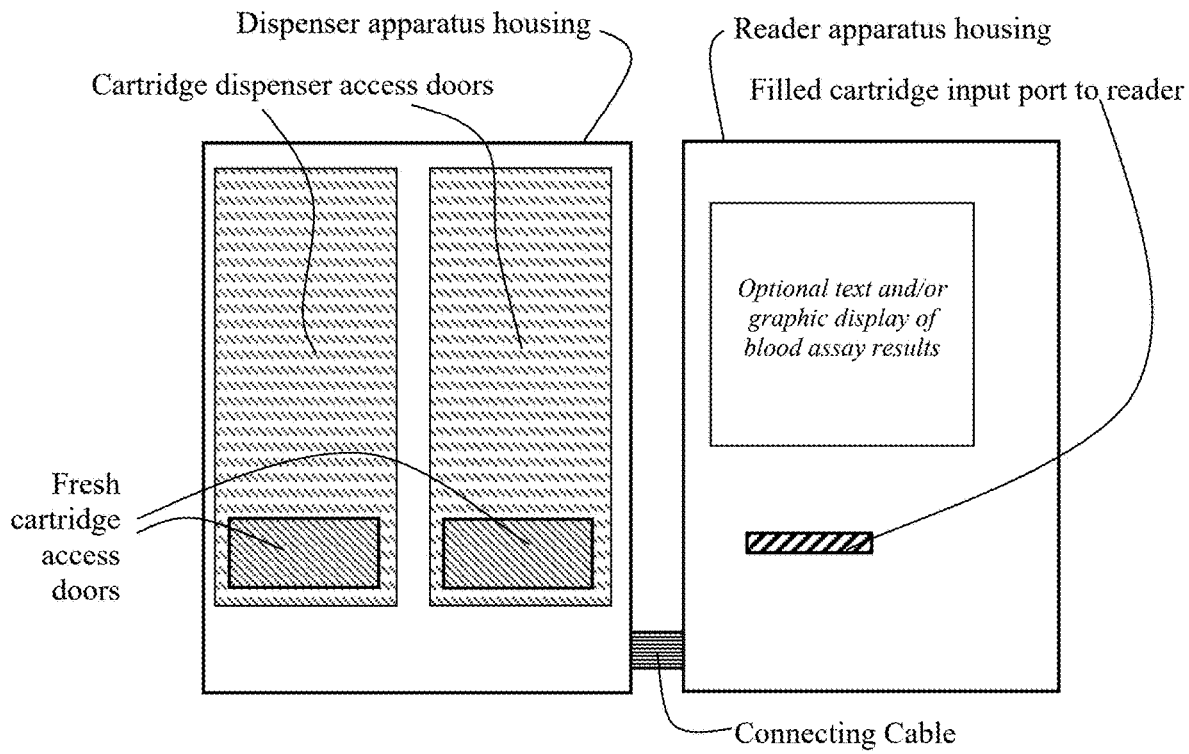
FIG. 4B: Heated Cartridge Dispenser and Reader System.

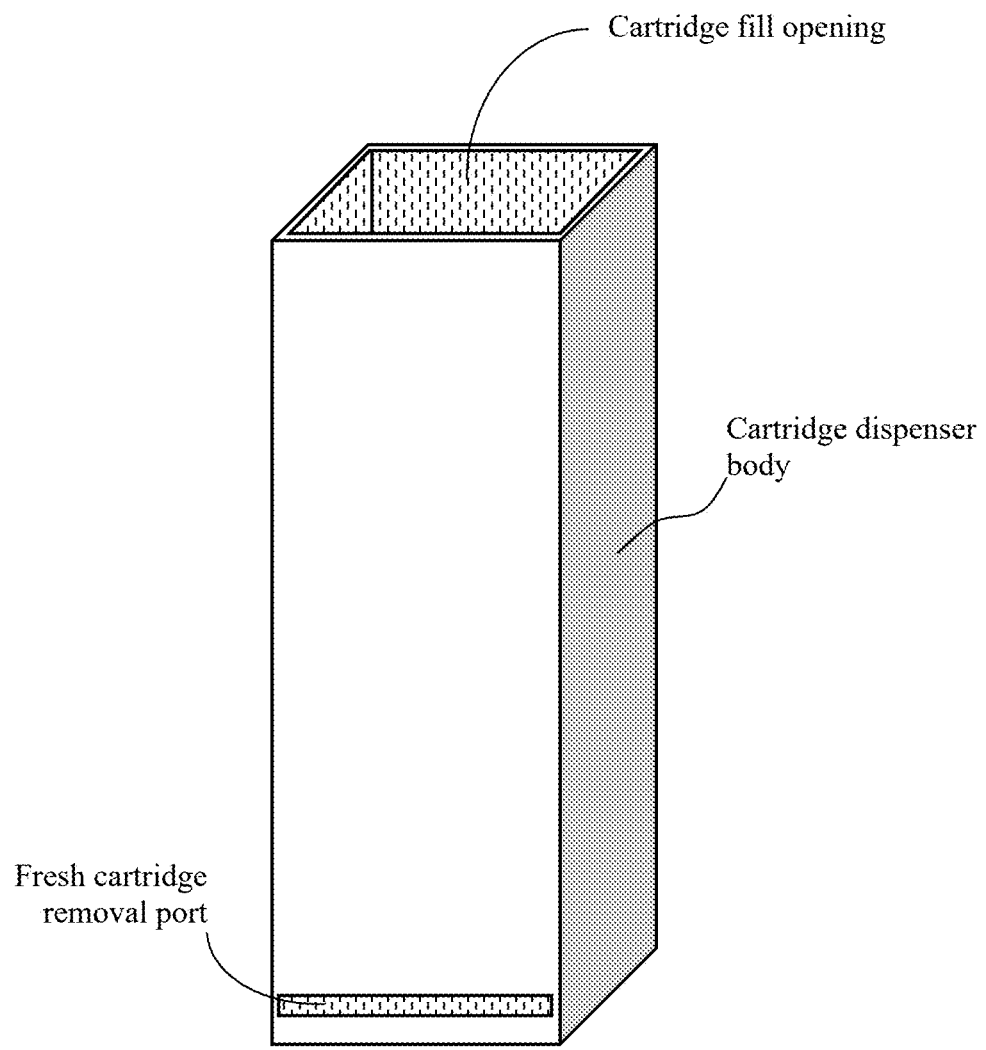
FIG. 5: Cartridge Dispenser

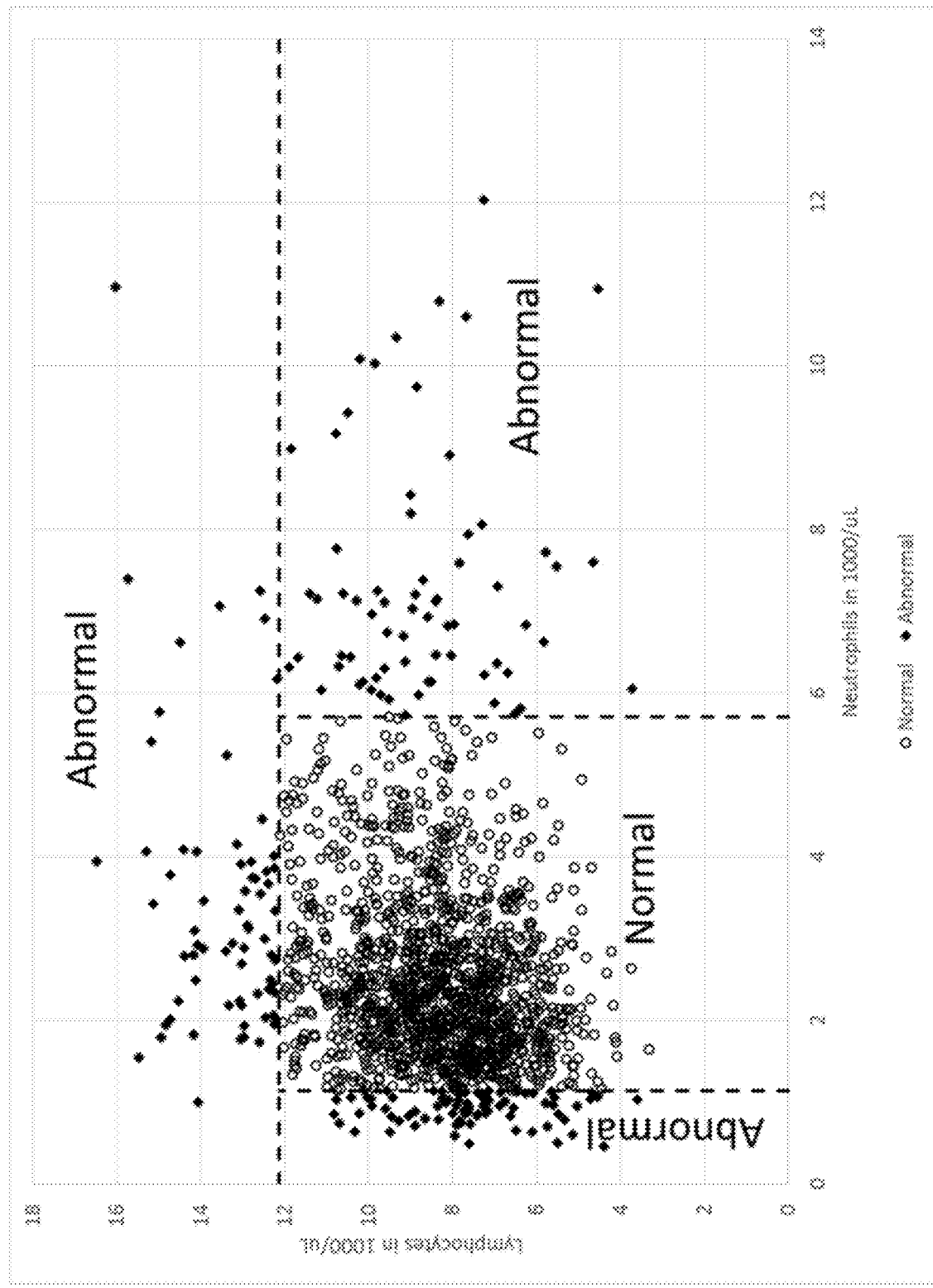
FIG. 6: Identification of an Index of Infection.

METHODS AND COMPOSITIONS FOR REDUCING ANTIBIOTIC ADMINISTRATION TO FARM ANIMALS

STATEMENT OF PRIORITY

This application is a continuation of and claims priority to U.S. patent application Ser. No. 15/466,814, filed Mar. 22, 2017, which claims the benefit, under 35 U.S.C. § 119(e), of U.S. Provisional Application Ser. No. 62/311,706, filed Mar. 22, 2016, the entire contents of which are incorporated by reference herein.

BACKGROUND OF THE INVENTION

In the production of farm animals such as beef cattle, swine and poultry, mass treatment of groups of animals with antibiotics to prevent disease outbreaks is common. There is, however, an increasing desire to reduce the administration of such antibiotics, particularly where the animals are raised as food for human consumption.

Unfortunately, livestock producers have few tools to identify which animals need treatment; it is difficult to distinguish infected animals that benefit from antibiotic treatment from those that are not infected. As animals are co-mingled, they are more likely to become infected, but infected animals may be difficult to distinguish from uninfected animals based on temperature or antibody response, especially if the exposure was recent. Animals, unlike humans, cannot provide a verbal response to a question of whether or not they feel sick. Finally, farm animals are often raised in large herds or flocks, and the amount of time available to diagnose an individual, animal is often extremely limited. Hence, in an effort to keep animals healthy and in an effort to ensure animals who need treatment get treated, entire herds or flocks are often administered an antibiotic, whether or not it is required by all members of that herd or flock. Alternatively, some pens or groups may receive no antibiotic even though individuals in the group may be infected.

Accordingly, new techniques are needed to rapidly diagnose those animals likely to have a current infection so they can be managed differently from those that do not show the signature of infection.

The present invention overcomes previous shortcomings in the art by providing methods and compositions for reducing antibiotic administration to farm animals.

SUMMARY OF THE INVENTION

In one aspect, the present invention provides a method of identifying an animal for which antibiotic treatment, anti-infective treatment, probiotic treatment, immunostimulant treatment, additional monitoring and/or a separate or alternative management strategy is appropriate, comprising: a) collecting a sample from said animal; b) performing a leukocyte differential cell count on said sample; c) comparing said leukocyte differential cell count of (b) with an index of infection; and d) initiating antibiotic treatment, anti-infective treatment, probiotic treatment, immunostimulant treatment, additional monitoring and/or a separate or alternative management strategy of said animal on the basis of said comparing step.

In a further aspect, the present invention provides a method of determining need for and/or timing of antibiotic treatment, anti-infective treatment, probiotic treatment, immunostimulant treatment, additional monitoring and/or a separate or alternative management strategy of an animal, comprising: a) collecting a sample from said animal; b) performing a leukocyte differential cell count on said sample; c) comparing said leukocyte differential cell count of (b) with an index of infection; and d) identifying the need for and/or timing of the antibiotic treatment, anti-infective treatment, probiotic treatment, immunostimulant treatment, additional monitoring and/or a separate or alternative management strategy of said animal on the basis of said comparing step.

In an additional aspect, the present invention provides a method of reducing or discontinuing antibiotic treatment, anti-infective treatment, probiotic treatment, immunostimulant treatment, additional monitoring and/or a separate or alternative management strategy of an animal that is receiving antibiotic treatment, anti-infective treatment, probiotic treatment, immunostimulant treatment, additional monitoring and/or a separate or alternative management strategy, comprising: a) collecting a sample from said animal; b) performing a leukocyte differential cell count on said sample; c) comparing said leukocyte differential cell count of (b) with an index of infection; and d) identifying that reducing or discontinuing antibiotic treatment, anti-infective treatment, probiotic treatment, immunostimulant treatment, additional monitoring and/or a separate or alternative management strategy of said animal is appropriate on the basis of said comparing step.

In another aspect, the present invention provides a method of tracking illness and/or treatment (e.g., antibiotic treatment) in a group of animals, comprising: (a) selecting an individual animal present in the group of animals; (b) collecting a sample from said animal of (a); (c) performing a leukocyte differential count on said sample; (d) comparing said leukocyte differential count of (c) to an index of infection; (e) assigning said individual animal to either a normal subgroup or an abnormal subgroup on the basis of said comparing step; (f) generating an electronic record for said animal comprising said animal's identity, said animal's leukocyte differential count history, said animal's illness history, and said animal's treatment and/or management strategy history; and (g) repeating steps (a) through (f) until all animals in said group of animals are assigned to either said normal subgroup or said abnormal subgroup and said electronic records are stored in a database.

In yet further aspects, the present invention provides an apparatus, comprising: (a) a housing having at least a first interior chamber; (b) an automated microscope in said first interior chamber; (c) at least one first cartridge dispenser in said first interior chamber; (d) at least one first cartridge dispenser access door in said housing and operatively associated with said first cartridge dispenser; (e) at least one first fresh cartridge access port in said housing and operatively associated with said first cartridge dispenser; (f) a filled cartridge insert port in said housing and operatively associated with said automated microscope; and (g) at least one beater operatively associated with said housing configured to heat both said automated microscope and said at least a first cartridge dispenser.

The present invention also provides a combination apparatus, comprising: (a) a first housing having at least a first interior chamber; (b) an automated microscope in said first interior chamber; (c) a second housing having at least a second interior chamber; (d) at least one first cartridge dispenser in said second interior chamber; (e) at least one first cartridge dispenser access door in said second housing and operatively associated with said first cartridge dispenser; (f) at least a first fresh cartridge access port in said second housing and operatively associated with said first cartridge dispenser; (g) a filled cartridge insert port in said first housing and operatively associated with said automated microscope; and (h) at least one heater operatively associated with each of said first and second housings configured to heat both said automated microscope and said at least a first cartridge dispenser.

BRIEF DESCRIPTION OF THE DRAWINGS

FIG. 2 is a flow diagram of the screening and sorting steps of one embodiment of a method of the present invention.

FIG. 3A is an internal schematic diagram of one embodiment of an apparatus useful for carrying out a method of the present invention.

FIG. 3B is an external schematic diagram of the apparatus of FIG. 3A.

FIG. 4A is an internal schematic diagram of a second embodiment of an apparatus useful for carrying out a method of the present invention.

FIG. 4B is an external schematic diagram of the apparatus of FIG. 4A.

FIG. 5 is a perspective view of a cartridge dispenser useful in an apparatus of FIGS. 3A, 3B, 4A, and 4B.

FIG. 6 is a schematic diagram of an imaging reader for imaging a sample.

DETAILED DESCRIPTION OF THE INVENTION

Figure 1:
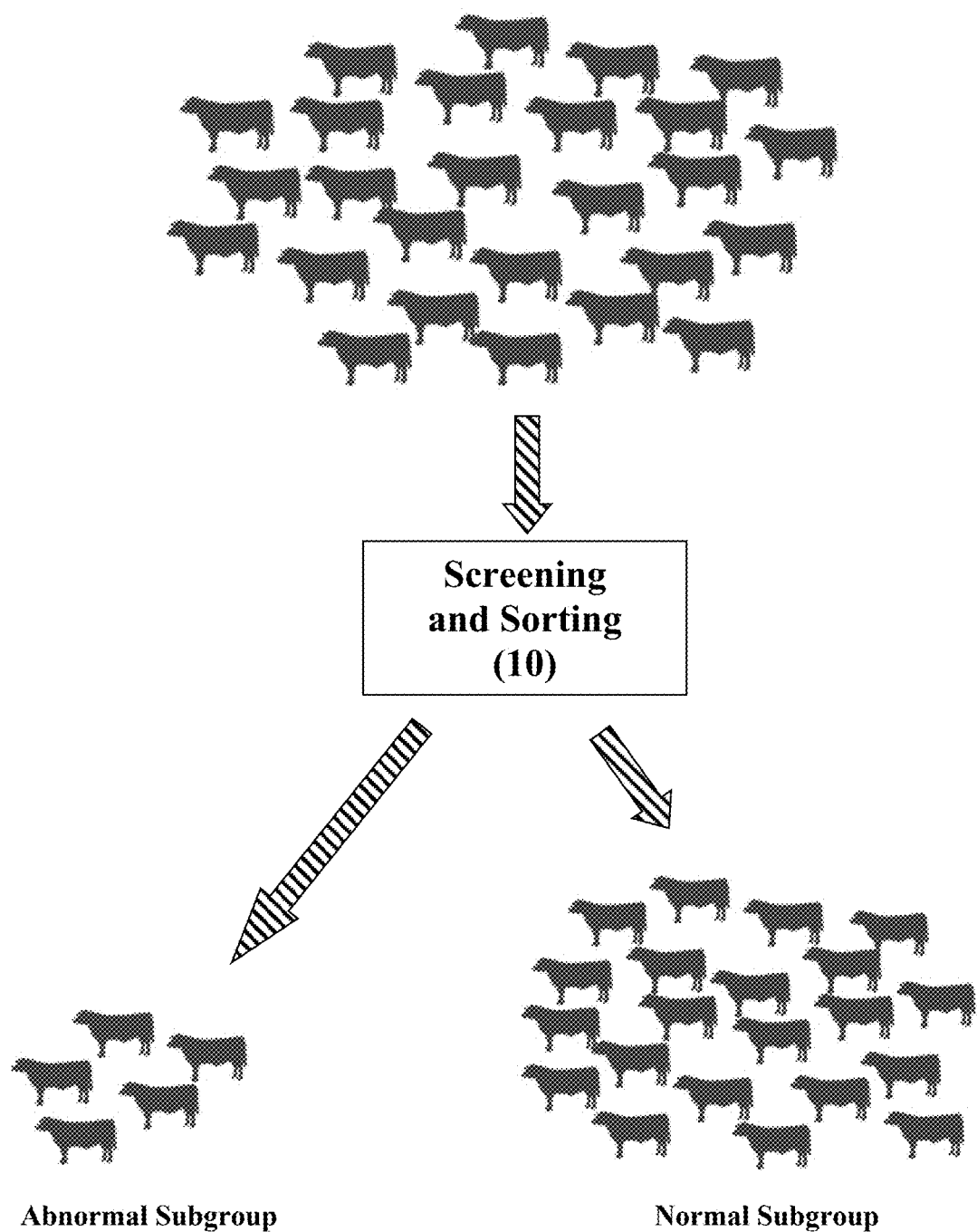
FIG. 1 is a schematic overview of a method of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

A subject "in need thereof" as used herein refers to a subject that can benefit from the therapeutic and/or prophylactic effects of the treatments and/or actions of the present invention. Such a subject can be a subject diagnosed with a disease or disorder of this invention, a subject suspected of having or developing a disorder or disease of this invention, and/or a subject determined to be at increased risk of having or developing a disease or disorder of this invention.

By the term "treat," "treating," or "treatment of" (and grammatical variations thereof) it is meant that the severity of the subject's condition is reduced, at least partially improved or ameliorated, and/or that some alleviation, mitigation or decrease in at least one clinical symptom is achieved and/or there is a delay in the progression of the disease or disorder.

The terms "prevent," "preventing," and "prevention of" (and grammatical variations thereof) refer to reduction and/or delay of the onset and/or progression of a disease, disorder and/or a clinical symptom(s) in a subject and/or a reduction in the severity of the onset and/or progression of the disease, disorder and/or clinical symptom(s) relative to what would occur in the absence of the methods of the invention. The prevention can be complete, e.g., the total absence of the disease, disorder and/or clinical symptom(s). The prevention can also be partial, such that the occurrence of the disease, disorder and/or clinical symptom(s) in the subject and/or the severity of onset and/or the progression is less than what would occur in the absence of a composition of the present invention.

As used herein, the terms "therapeutically effective amount" or "effective amount" refer to an amount of a composition or formulation or treatment of this invention that elicits a therapeutically useful response in a subject. Those skilled in the art will appreciate that the therapeutic effects need not be complete or curative, as long as some benefit is provided to the subject.

As used in the description of the invention and the appended claims, the singular forms "a," "an" and "the" are intended to include the plural forms as well, unless the context clearly indicates otherwise. For example, "a cell" can mean a single cell or a multiplicity of cells.

Also as used herein, "and/or" refers to and encompasses any and all possible combinations of one or more of the associated listed items, as well as the lack of combinations when interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The term "about," as used herein when referring to a measurable value such as an amount or concentration (e.g., the amount of the benzodiazepine in the pharmaceutical composition) and the like, is meant to encompass variations of 20%, 10%, 5%, 1%, 0.5%, 0.4% 0.3%, 0.2% or 0.1% of the specified value.

Unless the context indicates otherwise, it is specifically intended that the various features of the invention described herein can be used in any combination. For example, features described in relation to one embodiment may also be applicable to and combinable with other embodiments and aspects of the invention.

Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention.

All publications, patent applications, patents and other non-patent references mentioned herein are incorporated by reference herein in their entirety.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Animals on which the embodiments of the present invention may be implemented include, but are not limited to, beef cattle, dairy cattle, sheep, pigs, goats, rabbits and poultry (e.g., chickens, turkeys, ducks, geese, quail, pheasant, partridge such as Chukar Partridge, etc.).

Antibiotics or immunostimulants which may be administered to animals in accordance with the present invention include, but are not limited to the following antibiotic classes: aminocoumarins, aminoglycosides, amphenicols, cephalosporins, diaminopyrimidines, fluoroquinolones, glycolipids, ionophores, lincosamides, macrolides, penicillins, pleuromutilins, polypeptides, quinoxalines, streptogramins, sulfonamides, tetracyclines and combinations thereof.

Administration of antibiotics may be carried out by any suitable technique, including oral administration (e.g., by including the antibiotic compound in the feed of the animal as a feed additive), parenteral injection (e.g., intravenous injection, subcutaneous injection, intraarterial injection, intramuscular injection, etc.), etc.

A sample of this invention can include blood, milk, colostrum, urine, nasal mucous, vaginal secretions, mucous secretions, joint fluid, cerebrospinal fluid, fluid from aspirate, fluid from drainage, fluid from lavage or washing, tissue or any other biological sample from an animal that can contain leukocytes.

In one embodiment, the present invention provides a method of identifying an animal for which antibiotic treatment, anti-infective treatment, probiotic treatment, immunostimulant treatment, additional monitoring and/or a separate or alternative management strategy is appropriate, comprising: a) collecting a sample from said animal; b) performing a leukocyte differential cell count on said sample; c) comparing said leukocyte differential cell count of (b) with an index of infection; and d) initiating antibiotic treatment, anti-infective treatment, probiotic treatment, immunostimulant treatment, additional monitoring and/or a separate or alternative management strategy of said animal on the basis of said comparing step.

In the method described above, the comparing step can comprise, consist essentially of, or consist of comparing a neutrophil value in the leukocyte differential cell count with the neutrophil value of (a), comparing a lymphocyte value in the leukocyte differential cell count with the lymphocyte value of (b), and/or comparing a eosinophil value in the leukocyte differential cell count with the eosinophil value of (c), in any combination, wherein a neutrophil value, a lymphocyte value and/or an eosinophil value that is outside of the range of the respective neutrophil value of (a), the lymphocyte value of (b) and/or the eosinophil value of (c) identifies that antibiotic treatment, anti-infective treatment, probiotic treatment, immunostimulant treatment, additional monitoring and/or a separate or alternative management strategy is appropriate for said animal.

In a further embodiment, the present invention provides a method of determining need for and/or timing of antibiotic treatment, anti-infective treatment, probiotic treatment, immunostimulant treatment, additional monitoring and/or a separate or alternative management strategy of an animal (e.g., an animal in need thereof), comprising: a) collecting a sample from said animal; b) performing a leukocyte differential cell count on said sample; c) comparing said leukocyte differential cell count of (b) with an index of infection; and d) identifying the need for and/or timing of the antibiotic treatment, anti-infective treatment, probiotic treatment, immunostimulant treatment, additional monitoring and/or a separate or alternative management strategy of said animal on the basis of said comparing step.

In the method described above, the comparing step can comprise, consist essentially of or consist of comparing a neutrophil value in the leukocyte differential cell count with the neutrophil value of (a), comparing a lymphocyte value in the leukocyte differential cell count with the lymphocyte value of (b), and/or comparing a eosinophil value in the leukocyte differential cell count with the eosinophil value of (c), in any combination, wherein a neutrophil value, a lymphocyte value and/or an eosinophil value that is outside of the range of the respective neutrophil value of (a), the lymphocyte value of (b) and/or the eosinophil value of (c) identifies that antibiotic treatment, anti-infective treatment, probiotic treatment, immunostimulant treatment, additional monitoring and/or a separate or alternative management strategy is appropriate for said animal.

The present invention additionally provides a method of reducing or discontinuing antibiotic treatment, anti-infective treatment, probiotic treatment, immunostimulant treatment, additional monitoring and/or a separate or alternative management strategy of an animal that is receiving antibiotic treatment, anti-infective treatment, probiotic treatment, immunostimulant treatment, additional monitoring and/or a separate or alternative management strategy, comprising: a) collecting a sample from said animal; b) performing a leukocyte differential cell count on said sample; c) comparing said leukocyte differential cell count of (b) with an index of infection; and d) identifying or determining that reducing or discontinuing antibiotic treatment, anti-infective treatment, probiotic treatment, immunostimulant treatment, additional monitoring and/or a separate or alternative management strategy of said animal is appropriate on the basis of said comparing step.

In the method described above, the comparing step comprises comparing a neutrophil value in the leukocyte differential cell count with the neutrophil value of (a), comparing a lymphocyte value in the leukocyte differential cell count with the lymphocyte value of (b), and/or comparing a eosinophil value in the leukocyte differential cell count with the eosinophil value of (c), in any combination, wherein a neutrophil value, a lymphocyte value and/or an eosinophil value that is within the range of the respective neutrophil value of (a), the lymphocyte value of (b) and/or the eosinophil value of (c) identifies that reduction or discontinuation of the antibiotic treatment, anti-infective treatment, probiotic treatment, immunostimulant treatment, additional monitoring and/or a separate or alternative management strategy is appropriate for said animal.

In the methods of this invention, an index of infection can be, but is not limited to, a) a neutrophil value in a range from about $X_N \times 10^3$ cells/microliter to about $Y_N \times 10^3$ cells/microliter, wherein $X_N$ is 0, 0.1, 0.2, 0.3, 0.4, 0.5, 0.6, 0.7, 0.8, 0.9, 1.0, 1.1, 1.2, 1.3, 1.4, 1.5, 1.6, or $1.7 \times 10^3$ neutrophils per microliter, and $Y_N$ is 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or $12.0 \times 10^3$ neutrophils per microliter; b) a lymphocyte value in a range from about $X_L \times 10^3$ cells/microliter to about $Y_L \times 10^3$ cells/microliter, wherein $X_L$ is 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or $7.0 \times 10^3$ lymphocytes per microliter, and $Y^L$ is 10.0, 10.1, 10.2, 10.3, 10.4, 10.5, 10.6, 10.7, 10.8, 10.9, 11.0, 11.1, 11.2, 11.3, 11.4, 11.5, 11.6, 11.7 11.8, 11.9, 12.0, 12.1, 12.2, or $12.3 \times 10^3$ lymphocytes per microliter; c) an eosinophil value in a range from about $X_E \times 10^3$ cells/microliter to about $Y_E \times 10^3$ cells/microliter, wherein $X_E$ is $0.0 \times 10^3$ eosinophils per microliter and $Y_E$ is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ eosinophils per microliter; and d) any combination of (a), (b) and (c). It is understood that the values recited herein include any fraction of one tenth, one hundredth or one thousandth, etc., of said recited values. For example, a range from 0.0 to 0.1 includes 0.01, 0.02, 0.03, 0.04, 0.05, 0.06, 0.07, 0.08 0.09; a range from 1.0 to 1.1 includes 1.01, 1.02, 1.03, 1.04, 1.05, 1.06, 0.07, 1.08, 1.09; and a range from 1.1 to 1.2 includes 1.11, 1.12, 1.13, 1.14, 1.15, 1.16, 1.17, 1.18, 1.19, etc., as if each individual value was explicitly set forth herein.

In some embodiments, (a), (b) and (c) may be calculated as a percentage of total cells (e.g., total white blood cells).

In some embodiments, different indices may be used to optimize different end points. There are scenarios where minimizing hospital pulls (morbidity) is the most advantageous for the animal management strategy. Alternatively, maximizing weight gain could be the preferred animal management strategy. For example, to maximize an animal's weight gain, thresholds of neutrophils between 1.3 and $5.8 \times 10^3$ cells per microliter and of lymphocytes between 0 and $11.3 \times 10^3$ cells per microliter can be used. Another example would be a logical index for reducing morbidity such as: If eosinophils generally equal zero and neutrophils are in a range of 0.8 and $4.0 \times 10^3$ cells per microliter and lymphocytes are in a range of 7.0 and $10.8 \times 10^3$ cells per microliter, or if eosinophils are greater than zero cells per microliter and neutrophils are in a range from 1.66 and $5.4 \times 10^{\wedge}3$ cells per microliter and lymphocytes are in a range from 4.1 and $10.2 \times 10^3$ cells per microliter as measured in a sample from an animal or a plurality of animals in a group, then morbidity (e.g., the number of sick animals, can be minimized.

In some embodiments of this invention, an index of infection can be a monocyte value in a range from about $X_M \times 10^3$ cells/microliter to about $Y_M \times 10^3$ cells/microliter, wherein $X_M$ is $0.0 \times 10^3$ monocytes per microliter and $Y_M$ is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ monocytes per microliter.

In some embodiments of this invention, an index of infection can be a basophil value in a range from about $X_M \times 10^3$ cells/microliter to about $Y_M \times 10^3$ cells/microliter, wherein $X_M$ is $0.0 \times 10^3$ basophils per microliter and $Y_M$ is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ basophils per microliter.

In some embodiments, an index for neutrophils, lymphocytes, eosinophils, basophils and any other white blood cell type described herein may be calculated as a percentage of total cells (e.g., total white blood cells).

The indices for neutrophils, lymphocytes, eosinophils, monocytes and basophils described herein can be used singly or in any combination in the methods of this invention.

In the methods of this invention, an animal can be present in a group of animals (e.g., in a herd or flock or population, etc.). Each animal can be present singly, or in combination with other animals in the group of animals, in an enclosure, a pen, a corral, a coop, a dwelling, a barn, a field, a pasture, a container, a chute, etc., as would be known in the art. In some embodiments, one or more (including all) of the steps of the methods of this invention can be carried out on site, e.g., at the location where the animal or group of animals may be present, including, for example, chute-side or pen-side. In some embodiments, the methods of this invention can be carried out in an average time of not more than about 10, 9, 8, 7, 6, 5, 4, 3, 2 or 1 minutes. In particular embodiments, the steps are carried out chute-side and/or pen-side in an average time of not more than about 5, 2 or 1 minutes.

In some embodiments, the leukocyte differential cell count can be performed on a sample collected from each animal in a group of animals and compared with an index of infection and each animal can then be assigned to either a normal subgroup or an abnormal subgroup on the basis of said comparing step.

In some embodiments, animals of said normal subgroup and animals of said abnormal subgroup can be fed out together for a period of weeks and/or months while only animals of said abnormal subgroup are administered an antibiotic treatment, anti-infective treatment, probiotic treatment, immunostimulant treatment, additional monitoring and/or a separate or alternative management strategy.

In some embodiments, animals of said normal subgroup and animals of said abnormal subgroup are fed out together for a period of weeks and/or months while animals of said normal subgroup and animals of said abnormal subgroup are administered an antibiotic treatment, anti-infective treatment, probiotic treatment, immunostimulant treatment, additional monitoring and/or a separate or alternative management strategy.

In some embodiments, animals of said abnormal subgroup are segregated from animals of said normal subgroup.

In additional embodiments, the present invention provides a method of tracking illness and/or treatment in a group of animals, comprising: (a) selecting an individual animal present in the group of animals; (b) collecting a sample from said animal of (a); (c) performing a leukocyte differential count on said sample; (d) comparing said leukocyte differential count of (c) to an index of infection; (e) assigning said individual animal to either a normal subgroup or an abnormal subgroup on the basis of said comparing step; (f) generating an electronic record for said animal comprising said animal's identity, said animal's leukocyte differential count history, said animal's illness history, and said animal's treatment and/or management strategy history; and (g) repeating steps (a) through (f) until all animals in said group of animals are assigned to either said normal subgroup or said abnormal subgroup and said electronic records are stored in a database.

In some embodiments, the collecting step of the methods described herein comprises dispensing said sample into a cartridge, and said performing or generating step can be carried out with said sample in said cartridge.

In some embodiments, the cartridge can be pre-warmed to a pre-determined temperature, and said performing step or generating step can be carried out with a cartridge reader pre-warmed to substantially the same pre-determined temperature.

In some embodiments, wherein said collecting step includes transferring said sample to an automated microscope cartridge.

In some embodiments, the methods of this invention can comprise the step of administering an antibiotic treatment, anti-infective treatment, probiotic treatment, immunostimulant treatment, additional monitoring and/or a separate or alternative management strategy to animals of said abnormal subgroup and not to animals of said normal subgroup; (ii) hospitalizing animals of said abnormal subgroup and not animals of said normal subgroup; and/or (iii) quarantining animals of said abnormal subgroup from animals of said normal subgroup.

In some embodiments, the methods of this invention can further comprise the step of feeding out animals of said normal subgroup and/or animals of said abnormal subgroup; and/or (ii) periodically recording the weight of animals of said normal subgroup and/or of animals of said abnormal subgroup.

In some embodiments, animals of said normal subgroup and animals of said abnormal subgroup are fed out together for a period of weeks and/or months while only animals of said abnormal subgroup are administered an antibiotic treatment, anti-infective treatment, probiotic treatment, immunostimulant treatment, additional monitoring and/or a separate or alternative or different management strategy.

Nonlimiting examples of a management strategy of this invention include culling, antibiotic treatment, immunostimulant treatment, individualized treatment, group treatment and/or segregation. By alternative or different management strategy, in some embodiments, it is meant that the management strategy can be changed from a previous management strategy.

In some embodiments, animals of said normal subgroup and animals of said abnormal subgroup are fed out together for a period of weeks and/or months while animals of said normal subgroup and animals of said abnormal subgroup are administered an antibiotic treatment, anti-infective treatment, probiotic treatment, immunostimulant treatment, additional monitoring and/or a separate or alternative management strategy.

In some embodiments, animals of said abnormal subgroup are segregated from animals of said normal subgroup.

In some embodiment, animals of said abnormal subgroup are not administered an antibiotic treatment, anti-infective treatment, probiotic treatment, immunostimulant treatment, additional monitoring and/or a separate or alternative management strategy.

The present invention additionally provides a method for transferring health information to one or more parties, wherein health data are collected as described herein, uploaded to a web database documenting animals' health status, treatment status and/or subgroup, and made accessible to said one or more parties.

In additional embodiments of this invention, an apparatus is provided, comprising: (a) a housing having at least a first interior chamber; (b) an automated microscope in said first interior chamber; (c) at least one first cartridge dispenser in said first interior chamber; (d) at least one first cartridge dispenser access door in said housing and operatively associated with said first cartridge dispenser; (e) at least one first fresh cartridge access port in said housing and operatively associated with said first cartridge dispenser; (f) a filled cartridge insert port in said housing and operatively associated with said automated microscope; and (g) at least one heater operatively associated with said housing configured to heat both said automated microscope and said at least a first cartridge dispenser.

In some embodiments, the apparatus of this invention can also comprise (h) a second cartridge dispenser in said first interior chamber; (i) a second cartridge dispenser access door in said housing and operatively associated with said second cartridge dispenser; and (j) a second individual cartridge access port in said housing and operatively associated with said second cartridge dispenser.

In some embodiments, the apparatus of this invention can further comprise a heater controller operatively associated with said at least one heater; and at least one temperature sensor in said housing operatively associated with said heater controller.

In a further embodiment, the present invention provides a combination apparatus, comprising: (a) a first housing having at least a first interior chamber; (b) an automated microscope in said first interior chamber; (c) a second housing having at least a second interior chamber; (d) at least one first cartridge dispenser in said second interior chamber; (e) at least one first cartridge dispenser access door in said second housing and operatively associated with said first cartridge dispenser; (f) at least a first fresh cartridge access port in said second housing and operatively associated with said first cartridge dispenser; (g) a filled cartridge insert port in said first housing and operatively associated with said automated microscope; and (h) at least one heater operatively associated with each of said first and second housings configured to heat both said automated microscope and said at least a first cartridge dispenser.

In some embodiments, the combination apparatus of this invention can further comprise (i) a second cartridge dispenser in said second interior chamber; (j) a second cartridge dispenser access door in said second housing and operatively associated with said second cartridge dispenser; and (k) a second individual cartridge access port in said second housing and operatively associated with said second cartridge dispenser.

In an additional embodiment, the combination apparatus of this invention can also further comprise a heater controller operatively associated with each of said at least one heater; and at least one temperature sensor in each of said housings and operatively associated with said heater controller.

It will be understood that the methods of this invention can be carried out with the apparatus of this invention and/or with the combination apparatus of this invention.

The present invention provides, among other things, a rapid test that can conveniently be run at key animal movement times or on a repeated basis to determine likely risk of current infection (particularly odds of being sent to the hospital) and effect on performance (weight gain) so the producer can make management decisions (especially related to penning and treatment) to maximize individual animal health and economics. This predictive tool will help producers (for example, cattle feeders) make more informed decisions about animal management on arrival at the feedlot and or in the hospital, allowing for documentation of precise antibiotic use, reduced costs, improved animal welfare and better herd management practices.

While aspects of the present invention are described primarily with respect to beef cattle, the invention may also be used in the management of other farm animal industries, such as swine and poultry. For example, the movement of pigs to a nursery, gilt developing unit, breeding herd, or finishing house represents key animal movement times that are similar to that of cattle arriving at the feedlot. The invention can also be useful when animals are re-grouped and moved within the same facility, or at any time the risk of exposure to infection is high. Any time animals are exposed to new penmates or environment, the risk for transmission of new pathogens that can result in infection is increased. Another example of a key animal movement time in which animals are exposed to new potential infection based on co-mingling is the transfer of cattle from a cow-calf operation to stocker-backgrounder operation.

Accordingly, an aspect of the invention is a method of reducing or targeting antibiotic treatment of a group of farm animals or identifying individual animals that would benefit from antibiotic treatment, culling/harvesting early, additional testing or separate management strategy, comprising the steps of: (a) selecting an individual animal of the group (for example, while passing the animals sequentially through a single-file transfer chute); (b) collecting a sample from the individual animal (for example, while the animal is in the single-file transfer chute); (c) generating a leukocyte count, and or a differential cell count (for example, a lymphocyte, eosinophil, basophil, monocyte, neutrophil or band neutrophil count, such as by a white blood cell differential including number and/or percent of each relevant cell type in the sample, alone or in combination with ratios of blood cell types, combination of cell types and ratios of combinations of cell types, total leukocyte count, body temperature, and/or red blood cell count, optionally in combination with the animals' sex, breed, weight, age or body temperature) from the blood sample (for example, while the animal is in the single-file transfer chute); (d) comparing the cell count to an index of infection (for example, while the animal is in the single-file transfer chute); (e) transferring (for example, from the single-file transfer chute, through a single gate or one of at least a pair of gates), based on the index of infection, the individual animal to either a normal subgroup or an abnormal subgroup (for example, by: (i) passing the animal through one gate, or at least a pair of gates, to separate pens; and/or (ii) administering animals assigned to the abnormal subgroup an antibiotic, such as by parenteral injection, while the animal is still in the single-file transfer chute; etc., typically wherein both the normal subgroup and the abnormal subgroup are contained in the same, or separate, confined animal feeding operation (CAFO), such as a feedlot(s)); and (f) repeating steps (a) through (e) until all animals from the group are assigned to either the normal subgroup or the abnormal subgroup These groups may or may not be physically separated.

Another aspect of the invention is a method of determining need for or timing of antibiotic treatment, additional testing, culling or alternative management of a group of farm animals or other animals that are grouped and moved in pens (for example, swine or pigs), comprising the steps of: (a) collecting a sample from a portion (for example, two, three, four, or five or more, but less than all) of individual animals of the pen or group (for example, at random); (b) generating a leukocyte differential count from the samples; (c) comparing the leukocyte differential counts to an index of infection; and then (d) if a sufficient number of animals are infected based on above, intervening with measures such as feed ration changes or antibiotic use to protect the health of the group.

A further aspect of the invention is a method of tracking illness and/or antibiotic treatment in farm animals, especially at times of animal movement or co-mingling, comprising the steps of: (a) identifying an individual animal (for example, by electronically reading a tag on or associated with the animal (e.g., an active or passive RFID or bar-coded animal identification tag), or by manually recording an alphanumeric indicator on or associated with that animal (e.g., into the same automated microscope/reader in which the differential and/or leukocyte count is generated)); (b) collecting a sample from the animal (for example, including transferring the sample to an automated microscope/reader cartridge); (c) tying the sample to the animal (for example, by electronically reading a tag on or associated with the cartridge (e.g., an active or passive RFID or bar-coded cartridge identification tag), or by manually recording an alphanumeric indicator on or associated with that cartridge (e.g., into the same automated microscope/reader in which the differential and/or leukocyte count is generated)); (d) generating a white blood cell differential and/or leukocyte count (e.g. of all white blood cell types) from the sample; (e) comparing the differential and/or leukocyte count to an index of infection to assign the individual animal to either a normal subgroup or an abnormal subgroup (e.g., a group for which antibiotic administration, immunostimulant administration, probiotic, feed additive, anti infective, hospitalization, culling and/or quarantine is justified); (f) generating an electronic record for the animal (e.g., stored on the automated microscope and/or uploaded to a database on the world wide web) containing the animal's identity, white blood cell differential and/or leukocyte count, optionally but preferably such that the record can be subsequently audited to demonstrate treatment of only of animals in the abnormal subgroup and not animals in the normal subgroup; (g) repeating steps (a) through (f) until all animals from the group are tested and assigned to either the normal subgroup or the abnormal subgroup and the electronic records are stored in a common database. In some embodiments, the method further includes entering antibiotic treatment data for each animal in the electronic record corresponding to each animal in the database; and (h) optionally, but in some embodiments preferably, feeding out the animals of both the subgroups for at least 1, 2, 3 or 4 weeks, up to 6 weeks or more (e.g., for poultry), or at least 1, 2, 3, or 4 months, up to 10 months or more (e.g., for cattle), while administering only the animals of the abnormal subgroup an antibiotic.

In some embodiments of the foregoing, the method further includes feeding out the animals (of both the subgroups) for at least 1, 2, 3 or 4 weeks, up to 6 weeks or more (e.g., for poultry or swine), or at least 1, 2, 3, or 4 months, up to 10 months or more (e.g., for cattle or swine), while administering only the animals of the abnormal subgroup an antibiotic. The normal subgroups may also be treated if received follow on testing (i.e., as in a hospital test).

In some embodiments of the foregoing, the generating step is carried out with an automated microscope.

In some embodiments of the foregoing, the collecting step is carried out by venipuncture (for example, from the jugular vein or tail vein) or lancing of a capillary bed (for example, in the ear or snout of the animal).

In some embodiments of the foregoing, the collecting step (b), the generating step (c), and the comparing step (d) are together carried out chute-side or pen-side in an average time of not more than 5, 4, 3, 2, or 1 minutes.

In some embodiments of the foregoing, the animals of the abnormal subgroup are segregated from the animals of the normal subgroup to minimize transmission of sickness, optionally with or without administration of antibiotics or immunostimulants to animals of the abnormal subgroup (that is, are quarantined or hospitalized only).

In some embodiments of the foregoing, the animals of the normal subgroup are enrolled in a natural or organic feeding or maintenance program (for example, a certified organic or antibiotic-free program).

In some embodiments of the foregoing, the collecting step comprises dispensing the sample into a cartridge (e.g. an automated microscope reader cartridge), and the generating step is carried out with the sample in the cartridge (e.g., with the cartridge inserted in an automated microscope).

In some embodiments of the foregoing, the cartridge is pre-warmed to a pre-determined temperature (e.g., about 60, 65, 70, 75, 80, 85, 90, 95, 100, 105, 110 degrees Fahrenheit, etc.), and the generating step is carried out with a cartridge reader pre-warmed to the substantially the same pre-determined temperature (e.g., within five or ten degrees thereof).

In the methods of this invention, an index of infection can be, but is not limited to, a) a neutrophil value in a range from about $X_N \times 10^3$ cells/microliter to about $Y_N \times 10^3$ cells/microliter, wherein $X_N$ is 0, 0.1, 0.2, 0.3, 0.4, 0.5, 0.6, 0.7, 0.8, 0.9, 1.0, 1.1, 1.2, 1.3, 1.4, 1.5, 1.6, or $1.7 \times 10^3$ neutrophils per microliter, and $Y_N$ is 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or $12.0 \times 10^3$ neutrophils per microliter; b) a lymphocyte value in a range from about $X_L \times 10^3$ cells/microliter to about $Y_L \times 10^3$ cells/microliter, wherein $X_L$ is 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or $7.0 \times 10^3$ lymphocytes per microliter, and $Y_L$ is 10.0, 10.1, 10.2, 10.3, 10.4, 10.5, 10.6, 10.7, 10.8, 10.9, 11.0, 11.1, 11.2, 11.3, 11.4, 11.5, 11.6, 11.7 11.8, 11.9, 12.0, 12.1, 12.2, or $12.3 \times 10^3$ lymphocytes per microliter; c) an eosinophil value in a range from about $X_E \times 10^3$ cells/microliter to about $Y_E \times 10^3$ cells/microliter, wherein $X_E$ is $0.0 \times 10^3$ eosinophils per microliter and $Y_E$ is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ eosinophils per microliter; and d) any combination of (a), (b) and (c).

Some embodiments of the foregoing further comprise the step of: (i) administering an antibiotic or immunostimulant to the animals of the abnormal subgroup and not the normal subgroup; (ii) hospitalizing the animals of the abnormal subgroup and not the normal subgroup; and/or (til) quarantining the animals of the abnormal subgroup from the animals of the normal subgroup; (iv) culling the animals of the abnormal subgroup, which the selection of any of the afore management decisions can be aided by the leukogram profile.

Some embodiments of the foregoing further comprising the step of: (i) feeding out the animals of the normal subgroup and/or the abnormal subgroup; and/or (ii) periodically recording the weight of animals of the normal subgroup and/or the abnormal subgroup (e.g., and entering that weight into the corresponding electronic record for each the animal).

The present invention further provides a method for transferring health information to various animal owners wherein health data is collected as described herein, uploaded to a web database documenting animals' health status or subgroup, and data is accessed by the next entity in chain of custody of the animal to make treatment, grouping or management decisions.

The present invention further provides a method as described herein for predicting animal performance, especially average daily gain and/or hospitalization rate, based on chute-side/pen-side white blood cell differential at times of animal movement/co-mingling.

In some embodiments, the collecting step (b), the tying step (c), the generating step (d) and the comparing step (e) are together carried out chute-side or pen-side in an average time of not more than 5, 2, or 1 minutes.

Also described herein is an apparatus useful in a system for reducing antibiotic administration to a group of farm animals, including: (a) a housing having at least a first interior chamber; (b) an automated microscope in the first interior chamber; (c) at least a first cartridge dispenser in the first interior chamber; (d) at least a first cartridge dispenser access door in the housing and operatively associated with the first cartridge dispenser (e.g., for re-filling the cartridge dispenser with a plurality of fresh cartridges, which then may be warmed); (e) at least a first fresh cartridge access port in the housing (optionally in the access door) and operatively associated with the first cartridge dispenser; (f) a filled cartridge insert port in the housing and operatively associated with the automated microscope; and (g) at least one heater operatively associated with the housing configured to heat (e.g., to substantially the same temperature) both the automated microscope and the at least a first cartridge dispenser. The apparatus may further include: (h) a second cartridge dispenser in the first interior chamber; (i) a second cartridge dispenser access door in the housing and operatively associated with the second cartridge dispenser; and (j) a second individual cartridge access port in the housing and operatively associated with the second cartridge dispenser; (k) a separate detached heating chamber that is substantially the same temperature as the housing, or other suitable operating temperature. The apparatus may further include: a heater controller operatively associated with the at least one heater; and at least one temperature sensor in the housing operatively associated with the heater controller.

Also described herein is a combination apparatus useful in a system for reducing antibiotic administration to a group of farm animals, including: (a) a first housing having at least a first interior chamber; (b) an automated microscope in the first interior chamber; (c) a second housing having at least a second interior chamber; (d) at least a first cartridge dispenser in the second interior chamber; (e) at least a first cartridge dispenser access door in the second housing and operatively associated with the first cartridge dispenser (e.g., for re-filling the cartridge dispenser with a plurality of fresh cartridges, which then may be warmed); (f) at least a first fresh cartridge access port in the second housing (optionally in the access door) and operatively associated with the first cartridge dispenser; (g) a filled cartridge insert port in the first housing and operatively associated with the automated microscope; and (h) at least one heater operatively associated with each of the first and second housings configured to heat (e.g., to substantially the same temperature) both the automated microscope and the at least a first cartridge dispenser. The apparatus may further include: (l) a second cartridge dispenser in the second interior chamber; (j) a second cartridge dispenser access door in the second housing and operatively associated with the second cartridge dispenser; and (k) a second individual cartridge access port in the second housing and operatively associated with the second cartridge dispenser. The apparatus may further include: a heater controller operatively associated with each of the at least one heater; and at least one temperature sensor in each of the housings and operatively associated with the heater controller.

Animal agriculture is under increasing pressure to minimize antibiotic use because of rising public health concerns over antibiotic-resistant bacteria that can directly and indirectly foster antibiotic resistance in humans. In 2013, the Centers for Disease Control and Prevention (CDC) estimated that more than 2 million human illnesses and 23,000 human deaths are caused by antibiotic resistance in the US annually. Estimates of economic loss due to antibiotic resistance in the US vary but could be as high as $20 billion in direct healthcare cost and $35 billion per year including lost productivity (in 2008 dollars). A 2013 CDC publication called for a "change in the way antibiotics are used" as "perhaps the single most important action need to greatly slow down the development and spread of antibiotic-resistant infections." The present invention aims to create that change by giving livestock producers a fast, accurate screening tool to separate healthy animals from animals who would benefit from antibiotic intervention.

FIG. 1 schematically illustrates one embodiment of the invention, in which incoming beef cattle are sorted into a group that has the abnormal immune signature of infection, and as such, would either receive antibiotic treatment, additional testing, or be segregated, marked or managed separately, alone or in combination with any of the previous actions, and a group that has a normal, healthy blood profile and does not receive antibiotic treatment, segregation, or additional testing. Whenever treatment is referred to, it is used interchangeably with segregation, additional testing or managing separately. Screening and sorting is illustrated more fully in FIG. 2. In the non-limiting example embodiment, an animal is selected from the group, an automated microscope reader cartridge is dispensed and in cold temperatures would have first been pre-warmed (the details of which are discussed further below), a sample collected from the animal (before or after dispensing of the cartridge) is deposited into the cartridge, the cartridge inserted into an automated microscope reader which carries out a leukocyte differential cell count, and generates an indication of whether or not that animal should receive antibiotic treatment based on a previously determined index of infection. The animal is then directed into the appropriate (normal/abnormal) group, the cartridge removed from the reader, and the process repeated with the next animal until all animals are screened.

A sample can be collected by any suitable technique with any suitable apparatus, such as a lance, hollow needle, syringe, capillary action chamber, or combination thereof. A currently preferred device for collecting blood or other samples from cattle or cows is that described in PCT Publication No. WO 2017/019743, the disclosure of which is incorporated herein by reference in its entirety. From such initial collection device(s), the unclotted blood (with or without anti-coagulants) can then be transferred to the automated microscope cartridge.

Examples of automated microscope cartridges and automated microscope readers that perform leukocyte differential cell counts, and which may be adapted to carry out the present invention, include those described in U.S. Pat. No. 6,350,613 to Wardlaw, Levine, and Rodriguez, and in US Patent Application Publication No. US 2014/0009596 to Bresolin, Calderwood et al., the disclosures of which are incorporated by reference herein in their entirety. In general, the microscope cartridge includes a bottom portion, an optically transparent top portion (a "cover slip" or "window"), a flat or wedge-shaped chamber therebetween, and a port in fluid communication with that chamber for filling the chamber with a sample. When inserted into the automated microscope, imaging of cells in the sample can be carried out through the "window" or "cover slip," and a leukocyte count and/or differential can be generated automatically from those images.

Assignment of direction of the animal to a particular subgroup can optionally be carried out with the aid of an automated gate and chute system, such as described in U.S. Pat. No. 5,673,647 to Pratt and U.S. Pat. No. 8,418,660 to Hulls (which may be operatively linked or associated with the apparatus determining "normal" or "abnormal" status), before the animal departs from the chute or location in which the screening procedure has been carried out, or by any other suitable technique.

FIGS. 3A, 3B, 4A, 4B and 5 schematically illustrate a non-limiting example of an automated microscope apparatus of the invention. The apparatus generally includes (as is known in the art) an outer housing, and a cartridge reader (for example, an XYZ stage for receiving the cartridge, an automated microscope, and (optionally but in some embodiments preferably) a controller for the XYZ stage and automated microscope, and a computer and associated software for performing the leukocyte differential count and generating an indication of abnormal, which would indicate infection or stress, or normal, indicating no infection (such may also be located in a separate, local, device, or remotely or "on the cloud"). Additionally, the device includes at least one fresh cartridge dispenser (preferably at least two, as illustrated, and optionally three or more) located inside the housing, at least one heater, preferably a heater controller, and preferably at least one temperature sensor. The heater(s) and temperature sensor(s) are positioned to maintain the contents of the housing, particularly the fresh cartridges in the cartridge dispensers, and the cartridge reader, at substantially the same temperature, to minimize thermal shock during cartridge reading in cold temperatures, as discussed below.

The housing can be provided with an access door (e.g. top-hinged, side hinged, etc.) for removal of an empty cartridge dispenser and replacing it with a fresh cartridge dispenser filled with fresh cartridges. Or the cartridge dispenser can be permanently or semi-permanently fixed in the housing, and the access door configured to simply allow re-filling of an empty dispenser with fresh cartridges. An additional or separate access door (slot, or opening) for removal of individual fresh cartridges may be provided, optionally aided with a mechanical or electromechanical ejector mechanism. The presence of two cartridge dispensers allows fresh recently filled cartridges in one dispenser to be brought up to temperature while previously warmed cartridges are being dispensed from the other dispenser.

While the cartridge dispensers and cartridge reader are, in the embodiment of FIGS. 3A-3B, kept in a common housing, in the alternate embodiment of FIGS. 4A-4B the cartridge dispensers and cartridge reader are contained in separate housings with the components divided between two different housings, but with temperature regulated in a coordinated manner to be substantially the same in both (e.g., with a common controller, or with two separate controllers that control the two units in a coordinated manner).

An exemplary imaging reader 10 according to some embodiments is illustrated in FIG. 6. The imaging reader 10 includes a camera 12, a sample 14, a controller 16, and a display 18. As illustrated, the camera 12 is configured to image the sample 14, which may be inserted into the imaging reader 10, for example, using a sample cartridge. The camera 12 may include any optical components for imaging the sample, including a light source, lenses, and the like. The camera 12 may be any suitable imaging device, such as a CCD device, and may detect and produce digital images and/or intensity values of various signals. The imaging reader may be an automated microscope apparatus.

Individual components of the imaging reader 10 described herein may be as known in the art, or variations thereof that will be apparent to those skilled in the art based on the instant disclosure and prior automated microscopy apparatus such as described in U.S. Pat. No. 4,998,284 to Bacus; U.S. Pat. No. 5,790,710 to Price; U.S. Pat. No. 6,381,058 to Ramm; U.S. Pat. No. 6,929,953 to Wardlaw; U.S. Pat. No. 6,927,903 to Stuckey; U.S. Pat. No. 8,000,511 to Perz; U.S. Pat. No. 8,045,165 to Wardlaw; U.S. Pat. No. 8,081,303 to Levine; US Patent Application Nos. 2001/0041347 to Sammak; or 2009/0233329 to Rodriguez. The imaging reader 10 may be a QSCOUT™ reader commercially available from Advanced Animal Diagnostics (Research Triangle Park, North Carolina, USA).

The controller 16 may include a computer processor and may be configured to receive intensity values and/or images from the camera 12 and to analyze the intensity values and/or images and to display the results on the display 18.

The controller 16 may be further configured to carry out various automated steps of the methods described herein.

A nonlimiting example of an apparatus of this invention is the QSCOUT® reader, which uses a 365 nm excitation light to induce fluorescence of European microspheres. The signal is passed through a focal lens and then through a 610 nm emission filter and then to a monochrome camera. Images are processed for signal intensity from the camera to the onboard PC (computer). Results are then displayed on the color touchscreen.

The present invention is explained in greater detail in the following non-limiting Examples.

EXAMPLES

As one example, blood is collected from beef cattle chute side from the jugular vein, ear vein, tail vein, etc using any suitable blood collection and transfer device. From the collection and transfer device, the blood is transferred into an automated microscope cartridge. In a preferred embodiment, the cartridge has one microfluidic chamber, is 15 u deep, with a 9 mm×18 mm optically transparent cover slip, to allow for rapid fill at the low temperatures typically encountered during cattle transfer in the winter. There are other geometries that can accomplish this, such as (i) a coverslip that is 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18, 18.1 m in one side and in any combination in the same plane such that the other side can be 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18, 18.1 mm; (ii) at a depth of 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9 or 20.0 microns deep; (iii) may not have straight and orthogonal sides (e.g. a molded contoured edge); (iv) may not be parallel and thus may have an angle of 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 degrees (v) will have either a predetermined known volume range of the sample area (i.e., its viewing area multiplied by its depth) or will have a measured known volume used in the cells per volume calculations that can be (a) entered manually into the instrument or (b) read by the instrument via encoding technology such as barcoding or RFID.

A suitable automated microscope is an AAD QScout automated microscope/leukocyte reader (available from Advanced Animal Diagnostics, Inc., 633 Davis Drive, Suite 460, Morrisville, NC 27560 USA) modified as described above to contain a thermally protected storage area for fresh cartridges, and to keep the automated microscope itself at substantially the same temperature as those fresh cartridges. In general, it is important in chemistry and biological applications to keep the device and the cartridge at a minimum of 70 degrees F., and preferably closer to 90 degrees F. Since the unit is typically operated outside and exposed to very cold temperatures on the feedlot, this thermal protection is important to prevent thermal "shock" the white blood cells that may occur in colder ambient temperatures and impede successful stain penetration when the sample is added to the fresh slide.

Furthermore, keeping the fresh cartridges and instrument at substantially the same temperature reduces the effect of coefficient of thermal expansion mismatch (CTE mismatch). The cartridge is typically made of multiple materials, and contains a space or void into which fresh sample fills. Any CTE mismatch can cause slight warping which can lead to cells drifting out of the focal plane of the automated microscope. Maintaining uniform temperatures reduces this effect, allowing for fewer focal points and decreasing overall time to result. Otherwise, the operator would have to continually refocus to maintain focal plane as the slide expands and contracts.

The AAD QScout reader can produce the following results from a sample (e.g., a blood sample): (1) total leukocyte count per milliliter; (2) total lymphocyte count per milliliter; (3) total neutrophil count per milliliter; (4) total eosinophil count per milliliter; (5) total monocyte count per milliliter; (6) total basophil count per milliliter: (7) percent neutrophil, percent eosinophil, percent lymphocyte, percent monocyte, and percent basophil; and (6) detection of immature, non-segmented neutrophils including band neutrophils. In a non-limiting example, an "index of infection" based on total neutrophils per milliliter and total lymphocytes per milliliter is generated, as shown in FIG. 6. Additionally, other variants may optionally be included, such as ratios of the above blood cell types, combination of cell types and ratios of combinations of cell types, total leukocyte count, body temperature, and/or red blood cell count, optionally in combination with the animals' sex, weight, age and body temperature.

The animals identified as being "abnormal" in FIG. 6 can have a variety of pathogens and be at different points in the disease cycle. The automated differential allows for detection of "suspect viral" or suspect bacterial" allowing the producer to quarantine animals for improved herd management. Animals may be segregated into groups that are more likely to have a weight gain response to treatment vs. groups that are more likely to not have a weight gain response but are much less likely result in clinical illness based on treatment as demonstrated by being sent to the hospital pen.

Common practice in feed yards is the use of metaphylaxis, medication of an entire group of incoming cattle. A preliminary study moderate risk cattle suggests that approximately 85% of the cattle are "normal" and do not need to be treated with antibiotics upon arrival. On 10,000 head, this can equate to $100,000-$200,000 in antibiotic savings and reduce unnecessary use of antibiotics. In addition, in our preliminary studies, there is no substantial difference in average daily weight gain (ADG) between populations of "normal" animals receiving antibiotics and "normal" animals not receiving antibiotics. However, there is a difference between the ADG of "abnormal" animals receiving antibiotics and "abnormal animals" not receiving antibiotics: in our preliminary study, the "abnormal" animals that were treated outperformed the "abnormal" animals left untreated by approximately 0.35 pounds per day through 40 days on feed.

Workflow. The end-to-end process of sampling and testing cattle may be driven by bar code readers, RFID readers and/or simple numeric keypads. The ear tag or other identification tag of the animal is scanned into the QScout Reader (or the ID typed in with a keypad), the blood sample is drawn and blood placed in the automated microscope cartridge. The cartridge has its own bar code on the bottom label that is scanned by an on board scanner when the cartridge is retracted into the Reader. The QScout reader automatically associates that cartridge sample and test result with the animal ID scanned earlier. Test results are stored in a database residing in the QScout for on board reporting, and also pushed to a website database, where the producer can have access to all of his animals tested and can looking at test results from one unit, multiple units, multiple locations, etc.

The foregoing is illustrative of the present invention, and is not to be construed as limiting thereof. The invention is defined by the following claims, with equivalents of the claims to be included therein.

That which is claimed is:

1. A method of identifying and managing an animal or group of animals at a feedlot or confined animal feeding operation for which antibiotic treatment, anti-infective treatment, hospitalizing, quarantining, periodic weight recording, and/or culling is appropriate, comprising:
   a) collecting a blood sample from said animal or each animal in said group of animals;
   b) performing a leukocyte differential cell count on said sample;
   c) comparing said leukocyte differential cell count of (b) with an index of infection for eosinophils in combination with at least two cell types selected from neutrophils, non-segmented neutrophils, immature non-segmented neutrophils including band neutrophils, lymphocytes, monocytes, and basophils;
   d) determining need for treatment and/or effect on performance on the basis of said comparing step; and
   e) initiating antibiotic treatment, anti-infective treatment, hospitalizing, quarantining, periodic weight recording, and/or culling of said animal or group of animals on the basis of said determining step;
   wherein steps a)-d) are carried out in less than 3 minutes for each animal.

2. The method of claim 1, wherein said index of infection is:
   (i) an eosinophil value in a range from $X_E \times 10^3$ cells/microliter to $Y_E \times 10^3$ cells/microliter, wherein $X_E$ is $0.0 \times 10^3$ eosinophils per microliter and $Y_E$ is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ eosinophils per microliter; and
   (ii) a combination of at least two cell types selected from the group consisting of:
   a) a neutrophil or immature nonsegmented neutrophil, including band neutrophil, value in a range from $X_N \times 10^3$ cells/microliter to $Y_N \times 10^3$ cells/microliter, wherein $X_N$ is 0, 0.1, 0.2, 0.3, 0.4, 0.5, 0.6, 0.7, 0.8, 0.9, 1.0, 1.1, 1.2, 1.3, 1.4, 1.5, 1.6, or $1.7 \times 10^3$ neutrophils or immature nonsegmented neutrophil, including band neutrophil, per microliter, and $Y_N$ is 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, or $12.0 \times 10^3$ neutrophils or immature nonsegmented neutrophil, including band neutrophil, per microliter;

b) a lymphocyte value in a range from $X_L \times 10^3$ cells/microliter to $Y_L \times 10^3$ cells/microliter, wherein $X_L$ is 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or $7.0 \times 10^3$ lymphocytes per microliter, and $Y_L$ is 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, or $12.3 \times 10^3$ lymphocytes per microliter;

c) a monocyte value in a range from $X_M \times 10^3$ cells/microliter to $Y_M \times 10^3$ cells/microliter, wherein $X_M$ is or is about $0.0 \times 10^3$ monocytes per microliter and $Y_M$ is or is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ monocytes per microliter; and d) a basophil value in a range from $X_B \times 10^3$ cells/microliter to $Y_B \times 10^3$ cells/microliter, wherein $X_B$ is or is about $0.0 \times 10^3$ basophils per microliter and $Y_B$ is or is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or $2.0 \times 10^3$ basophils per microliter.

3. The method of claim 2, wherein said comparing step comprises comparing a eosinophil value in the leukocyte differential cell count with the eosinophil value of (i), and comparing a neutrophil or immature nonsegmented neutrophil, including band neutrophil, value in the leukocyte differential cell count with the neutrophil or immature nonsegmented neutrophil, including band neutrophil, value of (a), comparing a lymphocyte value in the leukocyte differential cell count with the lymphocyte value of (b), comparing a monocyte value in the leukocyte differential cell count with the monocyte value of (c), and/or comparing a basophil value in the leukocyte differential cell count with the basophil value of (d), in any combination, wherein an eosinophil value and a neutrophil or immature nonsegmented neutrophil, including band neutrophil, value, a lymphocyte value, a monocyte value, and/or a basophil value that is outside of the range of the respective eosinophil value of (i) and neutrophil or immature nonsegmented neutrophil, including band neutrophil, value of (a), the lymphocyte value of (b), the monocyte value of (c), and/or the basophil value of (d) identifies that antibiotic treatment, anti-infective treatment, hospitalizing, quarantining, periodic weight recording, and/or culling is appropriate for said animal.

4. The method of claim 1, wherein said animal is in a group of animals and wherein a leukocyte differential cell count is performed on a sample collected from each animal in said group of animals and compared with the index of infection and said each animal is assigned to either a normal subgroup or an abnormal subgroup on the basis of said comparing step.

5. The method of claim 4, wherein animals of said normal subgroup and animals of said abnormal subgroup are fed out together for a period of weeks and/or months while only animals of said abnormal subgroup are administered an antibiotic treatment, anti-infective treatment, hospitalizing, quarantining, periodic weight recording, and/or culling.

6. The method of claim 4, wherein animals of said normal subgroup and animals of said abnormal subgroup are fed out together for a period of weeks and/or months while animals of said normal subgroup and animals of said abnormal subgroup are administered an antibiotic treatment, anti-infective treatment, hospitalizing, quarantining, periodic weight recording, and/or culling.

7. The method of claim 4, wherein animals of said abnormal subgroup are segregated from animals of said normal subgroup.

8. The method of claim 1, wherein said collecting step comprises dispensing said sample into a cartridge, and said performing step is carried out with said sample in said cartridge.

9. The method of claim 8, wherein said cartridge is pre-warmed to a pre-determined temperature, and said performing step is carried out with a cartridge reader pre-warmed to substantially the same pre-determined temperature.

10. The method of claim 1, wherein said collecting step includes transferring said sample to an automated microscope cartridge.

11. The method of claim 1, wherein said animal is selected from the group consisting of beef cattle, dairy cattle, sheep, pigs, goats, and poultry.

12. The method of claim 1, wherein steps a)-d) are carried out in less than 2 minutes for each animal.

13. The method of claim 1, wherein steps a)-d) are carried out in less than 1 minute for each animal.

14. The method of claim 1, wherein step b) further comprises measuring total white blood cells.

15. The method of claim 14, wherein step b) further comprises measuring each cell type as a percentage of total white blood cells.

16. The method of claim 1, wherein step b) further comprises measuring a ratio of at least one cell type to at least one other cell type.

17. The method of claim 1, wherein all of the steps are carried out at the location of the animal or group of animals.

18. The method of claim 17, wherein all of the steps are carried out chute-side or pen-side.

19. The method of claim 1, wherein the sample collected from the animal is deposited into a cartridge, the cartridge is inserted into an automated microscope reader which carries out a leukocyte differential cell count and generates an indication of whether or not that animal should receive antibiotic treatment, anti-infective treatment, hospitalizing, quarantining, weight recording, and/or culling.

20. The method of claim 1, wherein said leukocyte differential cell count of (b) is compared with an index of infection for eosinophils in combination with at least three cell types selected from neutrophils, non-segmented neutrophils, immature non-segmented neutrophils including band neutrophils, lymphocytes, monocytes, and basophils.

21. The method of claim 1, further comprising the step of:
(f) generating an electronic record for said animal or each animal in said group of animals comprising said animal's identity, said animal's leukocyte differential count history, said animal's illness history, and said animal's treatment and/or management strategy history.

22. A method of identifying an animal or group of animals at a feedlot or confined animal feeding operation in need of prophylactic antibiotic treatment, anti-infective treatment, hospitalizing, quarantining, periodic weight recording, and/or culling comprising:
a) collecting a blood sample from said animal or each animal in said group of animals;
b) performing a leukocyte differential cell count on said sample;

c) comparing said leukocyte differential cell count of (b) with an index of infection for a combination of at least three-cell types selected from neutrophils, non-segmented neutrophils, immature non-segmented neutrophils including band neutrophils, lymphocytes, eosinophils, monocytes, and basophils;

d) determining need for treatment and/or effect on performance on the basis of said comparing step; and e) initiating antibiotic treatment, anti-infective treatment, hospitalizing, quarantining, periodic weight recording, and/or culling of said animal or group of animals on the basis of said determining step.

23. A method of preventing or delaying onset of infection in an animal or group of animals at a feedlot or confined animal feeding operation, comprising a) collecting a blood sample from said animal or each animal in said group of animals;

b) performing a leukocyte differential cell count on said sample;

c) comparing said leukocyte differential cell count of (b) with an index of infection for a combination of at least three-cell types selected from neutrophils, non-segmented neutrophils, immature non-segmented neutrophils including band neutrophils, lymphocytes, eosinophils, monocytes, and basophils;

d) determining need for treatment and/or effect on performance on the basis of said comparing step; and e) initiating antibiotic or anti-infective treatment of said animal or group of animals on the basis of said determining step, thereby preventing or delaying onset of infection in the animal or group of animals.

* * * * *